Nov. 18, 1941.   K. A. BROWNE   2,263,453
TWO-SPEED SUPERCHARGER DRIVE
Filed June 7, 1940
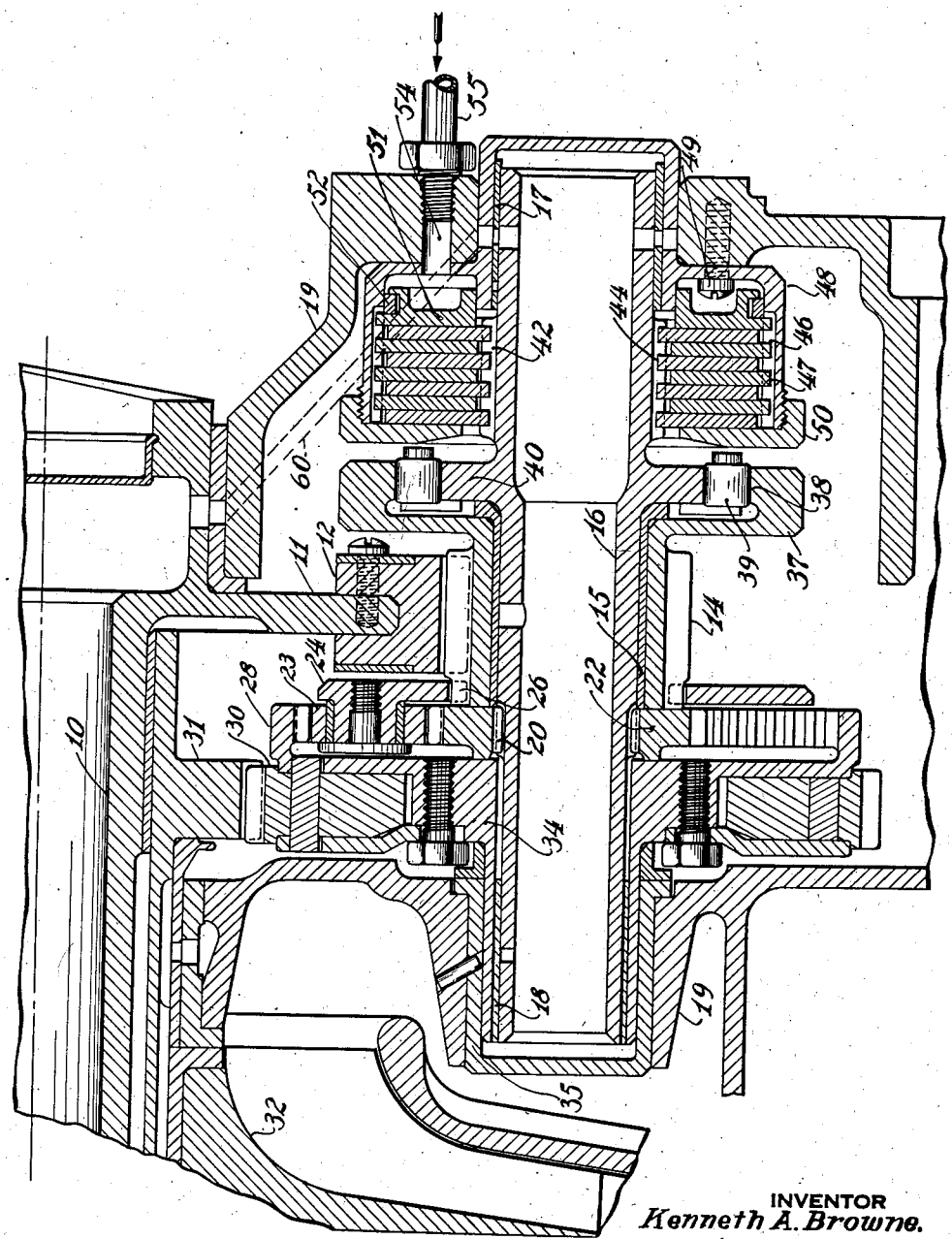
INVENTOR
*Kenneth A. Browne.*
BY
*ATTORNEY*

Patented Nov. 18, 1941

2,263,453

UNITED STATES PATENT OFFICE 2,263,453

TWO-SPEED SUPERCHARGER DRIVE

Kenneth Alan Browne, Fairlawn, N. J., assignor to Wright Aeronautical Corporation, a corporation of New York Application June 7, 1940, Serial No. 339,207

3 Claims. (Cl. 74—290)

This invention relates in general to a multi-speed planetary gearset and in particular, to a two-speed drive system for an aircraft engine supercharger. The invention in some respects comprises improvements in the supercharger drive mechanisms shown in Chilton Patents Nos. 2,034,087 and 2,101,239, issued respectively on March 17, 1936, and December 7, 1937.

In both of said Chilton patents as well as in the present invention, a supercharger impeller concentric with the engine crankshaft is driven through step-up gears on a layshaft, the gears on the layshaft being separated from one another by a planetary speed changer on the layshaft which may be selectively operated to afford direct drive between the layshaft gears or a change speed drive between the layshaft gears. In the Chilton arrangements, direct drive comprised the high ratio drive whereas drive through the planet system comprised the low ratio drive. In the subject invention, the reverse is true: that is, direct drive between the layshaft gears is the low ratio drive whereas, when the planetary speed changer is in operation, the layshaft driving gear rotates faster than the layshaft driven gear.

Objects of the invention include the provision of a hydraulic mechanism for shifting between low ratio and high ratio drives, the housing of said mechanism being non-rotative whereby certain disadvantages encountered in connection with rotating hydraulic clutches are overcome.

A further object of the invention includes the provision of an overrunning clutch upon which the supercharger drive drops when the hydraulic mechanism is disengaged.

A further object consists in the use of a planetary gearset on a supercharger layshaft as a step-up gearset rather than as a step-down gearset. By the combinations of mechanisms included in the invention, the selectively operable hydraulic mechanism receives torque reaction for the high ratio supercharger drive which torque reaction is substantially greater than the torque from the low ratio drive, since as R. P. M. increases in the supercharger, the driving torque necessary likewise increases. This allows the overrunning clutch above mentioned to operate under the low range of torque conditions, rather than the high range, and thereby increases the life and effectiveness of this part of the mechanism.

For a clearer understanding of the details of the invention, reference may be made to the figure of the drawing which is a longitudinal sectional view of the two-speed mechanism, shown in conjunction with certain well known basic parts of an aircraft engine.

In the figure, 10 represents the rearward end of an engine crankshaft extension provided with an integral flange 11 to which a large spur gear 12 is secured. This gear engages a layshaft driven gear 14 freely journalled, through a bushing 15, upon a layshaft 16, carried in end bushings 17 and 18 in the engine housing 19. Splined to the layshaft 16 at 20, is a sun gear 22 engaged with planet pinions one of which is shown at 23 journalled on a spider 24 splined to the driven gear 14 at 26. A ring gear 28 embraces and engages the pinions 23 and is drivably secured to a supercharger drive gear 30 engaged with a supercharger pinion 31 rotatably rigid with a supercharger impeller 32. The relatively rigid ring gear 28 and gear 30 are carried by a hub 34 borne in the thimble bushing 35 in the housing 19. At the righthand end of the driven pinion 14, a flange 37 is formed having an annular track 38 engaged by rollers 39 which comprise a one-way clutch, the rollers being engaged on their inner surfaces by a conventional one-way clutch inner raceway designated as 40, this raceway 40 being formed integral with the layshaft 16. The layshaft at its righthand end carries splines 42 upon which are assembled brake plates 44 alternately disposed with brake plates 46 splined as at 47 in a brake housing 48 secured as at 49 to the engine housing 19. A brake housing cover 50 retains the several plates in the housing and the righthand end of the housing 48 comprises a hydraulic cylinder in which a piston 51 is axially movable, this piston being sealed in the housing by a split ring 52. An opening 54 is provided in the end of the brake housing and engine housing for connection to a pipe line 55 leading to a controllable source of fluid pressure.

The operation of the mechanism will be apparent from the following: If the drive gear 12 be rotated and if fluid pressure be provided to the hydraulic brake housed in 48, the layshaft 16 is secured against rotation along with the sun gear 22. Accordingly, the spider 24 will be rotated with the gear 14 to effect a step-up drive to the ring gear 28 and consequently to the gears 30 and 31 and the supercharger impeller 32. In this condition of adjustment, the overrunning clutch represented by the elements 38, 39, and 40 will run free, since the pinion 14 obviously is rotated whereas the layshaft 16 is stationary.

Now, if fluid pressure be relieved from the housing 48, the brake plates 44 and 46 will disengage and the drive will drop back upon the overrunning clutch 38, 39, 40 whereby the elements 14, 16, 22, 24, and 28 will be locked together as a unit, whereby there is a unitary drive from the layshaft gear 14 to the supercharger drive gear 30 in a ratio established by the relative sizes of the gears 12, 14, and 30, 31.

It will be apparent that in the high speed drive ratio, with the hydraulic brake engaged, the low speed drive ratio will be increased by an amount depending upon the ratio of a planetary gearset comprised by the sun gear 22, the planet pinions 23, and the ring gear 28 wherein in the latter assembly, the sun gear 22 is a reaction member, the spider 24 the drive member, and the ring gear 28 the driven member.

Although not a specific part of the invention, it may be noted that lubrication for the gearset is accomplished as follows: The hollow crankshaft extension 10 acts as an oil reservoir from which lubricant may pass through a passage 60 through the hollow layshaft 16 which is provided with drillings at the various bearings embracing same for lubrication thereof. The gears and pinion bearings are lubricated by oil bleeding from these several bearings.

It will be apparent from the above that the objectives recited at the beginning of this description are readily attainable—the hydraulic brake is a stationary mechanism and is not subject to centrifugal action which has been found in some instances to be disadvantageous due to the gathering of foreign matter, sludge and the like at the outer edge of the hydraulic cylinder which has caused faulty operation of certain mechanisms of the prior art.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A supercharger drive gearset comprising a housing having spaced alined bearings, a power delivery member journalled in one said bearing and comprising a rim having an external driving gear and an internal gear, a layshaft journalled in said other bearing, means to pilot the layshaft and delivery gear one in the other for relative rotation and for maintenance of axial alinement of both, a sun gear on the layshaft coplanar with the internal gear, a power-receiving pinion journalled on said layshaft between the sun gear and said other bearing, a planet-pinion-carrying spider secured to said power-receiving pinion, the planet pinions thereof being engaged with the sun and internal gears, an overrunning clutch outer raceway on the other end of said power receiving pinion from the spider, said raceway being rotatable therewith, an overrunning clutch inner raceway rotatable with the layshaft and coplanar with the outer raceway, clutch rollers between said raceways, a plurality of brake discs on the layshaft between said overrunning clutch and said other bearing, a brake receptacle on the housing adjacent said other bearing, brake discs carried thereby engageable with alternate brake discs on the layshaft, and means to enforce braking engagement between said discs.

2. A supercharger drive gearset comprising a housing having spaced alined bearings, a hub carried in one bearing the hub including a web member peripherally provided with driving means and having an internal gear, a layshaft journalled in the other bearing and piloted in bearing relation with said hub, elements serially arranged from said hub toward said other bearing comprising a sun gear on the layshaft coplanar with the internal gear; a sleeve borne on the layshaft including sequentially a planet-pinion-carrying spider whose pinions are engaged with the sun and internal gears, a driven means and a one-way clutch raceway; a one-way clutch raceway on the layshaft, there being clutch rollers between said raceways; and a multi-disc selectively operable brake comprising discs alternately keyed to the layshaft and to the housing adjacent said other bearing.

3. A supercharger drive gearset comprising a housing having spaced alined bearings, a hub carried in one bearing the hub including a web member peripherally provided with driving means and having an internal gear, a layshaft journalled in the other bearing and piloted in bearing relation with said hub, elements serially arranged from said hub toward said other bearing comprising a sun gear on the layshaft coplanar with the internal gear; a sleeve borne on the layshaft including sequentially a planet-pinion-carrying spider whose pinions are engaged with the sun and internal gears, a driven means and a one-way clutch raceway; a one-way clutch raceway on the layshaft, there being clutch rollers between said raceways; and a multi-disc selectively operable brake comprising discs alternately keyed to the layshaft and to the housing adjacent said other bearing, the driving means on said web and the driven means on said sleeve comprising gears meshed respectively with a power gear and a gear to which power is to be provided.

KENNETH ALAN BROWNE.